H. M. P. MURPHY.
AIR BRAKE APPARATUS.
APPLICATION FILED MAR. 21, 1908.
912,712.
Patented Feb. 16, 1909.
2 SHEETS—SHEET 2.
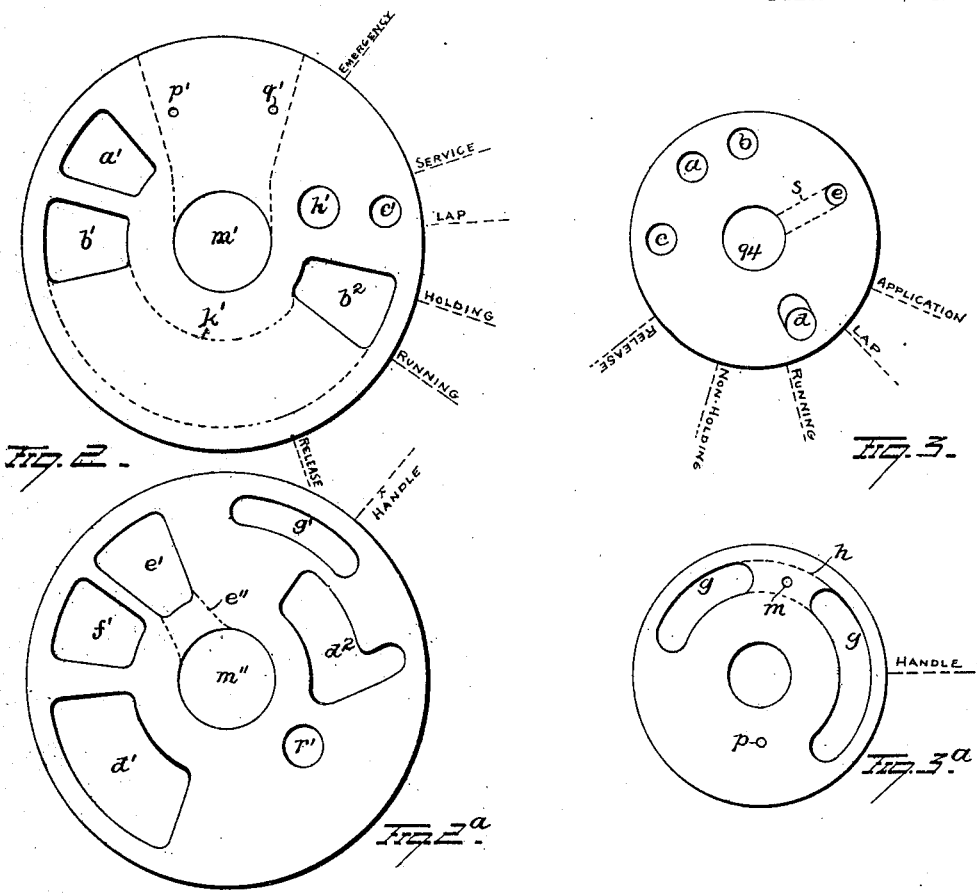
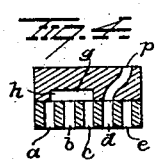 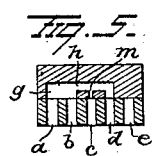 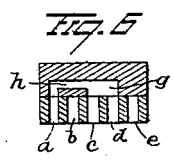 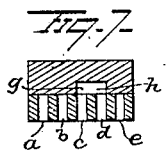 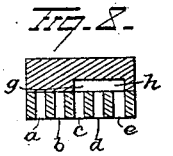
WITNESSES
INVENTOR
H. M. P. Murphy
By H. A. Seymour
Attorney

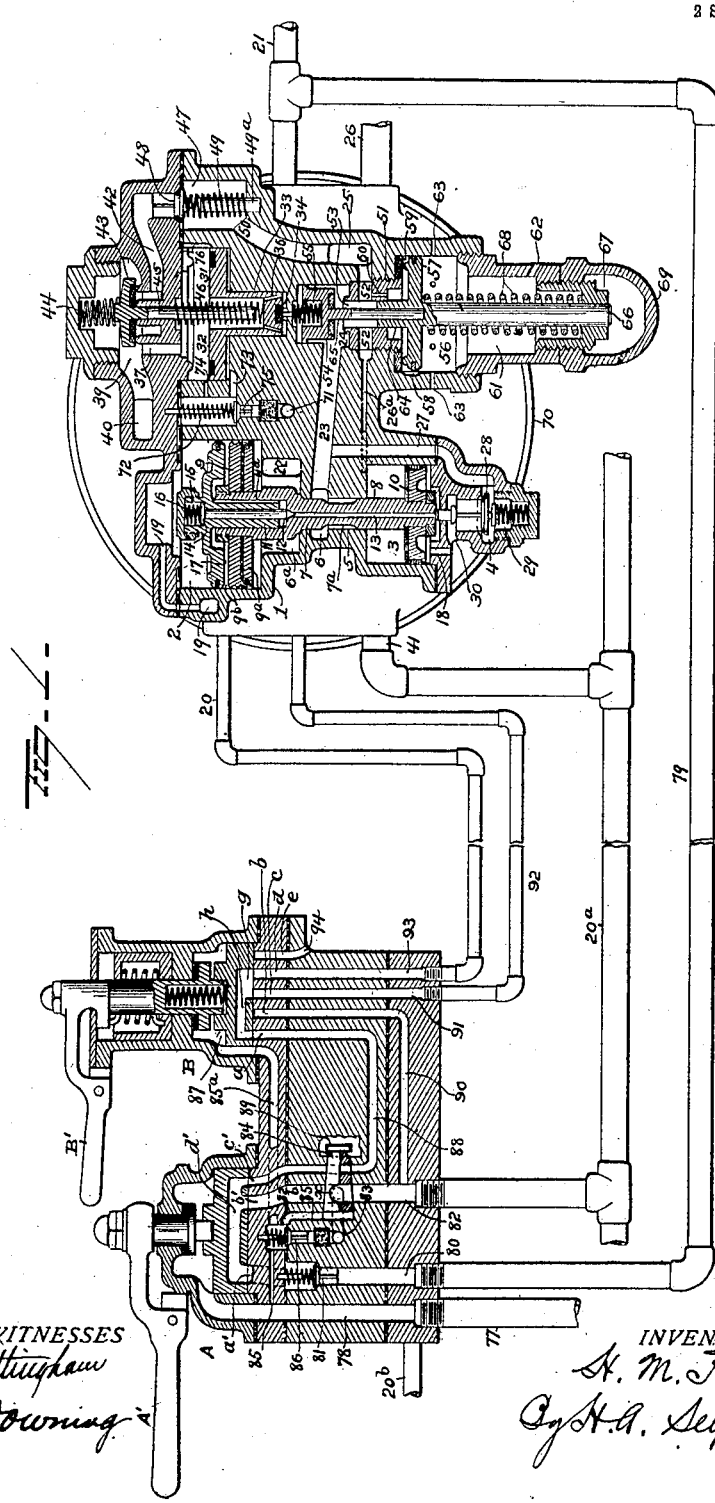

UNITED STATES PATENT OFFICE.

HOWARD M. P. MURPHY, OF PITTSBURG, PENNSYLVANIA, ASSIGNOR OF ONE-FOURTH TO L. H. BOWMAN, OF MUNHALL, PENNSYLVANIA, AND ONE-EIGHTH TO JOSEPH M. FLANNERY, OF PITTSBURG, PENNSYLVANIA.

AIR-BRAKE APPARATUS.

No. 912,712.      Specification of Letters Patent.      Patented Feb. 16, 1909.

Application filed March 21, 1908. Serial No. 422,532.

*To all whom it may concern:*

Be it known that I, HOWARD M. P. MURPHY, a resident of Pittsburg, in the county of Allegheny and State of Pennsylvania, have invented certain new and useful Improvements in Air-Brake Apparatus; and I do hereby declare the following to be a full, clear, and exact description of the invention, such as will enable others skilled in the art to which it appertains to make and use the same.

This invention relates to improvements in air brake apparatus, and more particularly to such as is adaptable for use in controlling the brakes of a locomotive and its tender,— one object of the invention being to provide a mechanism by means of which the brakes on the locomotive and tender can be operated in unison with or separately from the brakes on the remainder of the train.

A further object is to so construct such mechanism that it shall provide for positive and effective maintenance of any desired brake cylinder pressure regardless of any leakage which might occur from the brake cylinders.

A further object is to provide means for limiting the maximum brake cylinder pressure obtainable in ordinary service applications to a definite degree, but to so construct the mechanism, that in cases of emergency, a much higher pressure can be obtained in the brake cylinders.

A further object is to provide means whereby said high pressure in the brake cylinders can be gradually reduced after a certain length of time, to a lower degree.

A further object is to so construct the mechanism that provision shall be made for venting the train pipe pressure in cases of emergency in order to assist in a rapid reduction of pressure in said train pipe under the conditions above stated.

A further object is to provide in a single structure; simple and efficient means for effecting the application and release of the brakes; means for maintaining any desired pressure in the brake cylinders; means for limiting the degree of brake cylinder pressure obtainable in ordinary service to any predetermined point; means for obtaining a higher brake cylinder pressure in emergency than in ordinary service; means for effecting a gradual reduction of said high pressure in the brake cylinders to a somewhat lower point, and means for venting the brake pipe air to the brake cylinders in cases of emergency.

With these objects in view, the invention consists in certain novel features of construction and combinations of parts as hereinafter set forth and pointed out in the claims.

In the accompanying drawings; Figure 1 is a sectional view (with the piping shown in elevation) showing one embodiment of my invention, the ducts in the manually operated valve devices being shown diagrammatically. Fig. 2 is an enlarged plan view of the seat for the manually-operated valve A. Fig. 2[a] is an enlarged bottom plan view of the manually operated valve A. Fig. 3 is an enlarged plan view of the seat for the manually-operated valve B. Fig. 3[a] is an enlarged bottom plan view of the manually opperated valve B. Figs. 4, 5, 6, 7 and 8 are diagrammatical sectional views of the smaller rotary valve and its seat showing how the ports in same are connected, in the various positions of the valve.

1 represents a valve casing provided in its upper portion with a chamber 2; in its intermediate portion with a chamber 3, and in its lower portion with an exhaust chamber 4. A passage 5 having an enlarged portion 6, 6[a] extends from the chamber 2 to the chamber 3, and in the upper portion of this passage, a seat is provided for a valve 7 on a rod 8. This rod, which extends through the passage 5, is made with grooves or a contracted portion 7[a], and at the upper end of said rod, a piston 9 is provided and movable in the chamber 2, while the lower end of the rod 8 carries a piston 10 movable in the chamber 2, the two pistons 9 and 10 being thus connected so that they will move simultaneously. The chamber 2 receives train pipe pressure above the piston 9, and said chamber receives supply pressure below the piston 9,—the piston 10 in chamber 3 being subjected to brake cylinder pressure on one side and to atmospheric pressure on the other side,—all as hereinafter more fully explained.

In order to prevent a leakage of supply fluid past the piston 9 in the chamber 2 in case the piston packing should become worn or defective, the following instrumentalities are provided: The piston 9 comprises two members, 9[a] and 9[b], the member, 9[a] being rigidly secured to the rod 8, and the member 9$^b$ adapted to have a slight movement independently thereof. The member 9$^b$ is provided with a tubular stem 11 movable in the tubular upper end of the rod 8 and passing through said tubular stem 11 is a valve rod 12, the lower end of which closes a duct 13 in the rod 8 through which duct and duct 11$^a$ in the tubular stem 11, any excess of air leaking between the piston members 9$^a$ and 9$^b$ may pass to the chamber 3 below the piston 10 and finally to the atmosphere. The upper end of the valve rod 12 is provided with a head 14 disposed in a small chamber 15 on the piston member 9$^a$ and within this chamber, a small spring 16 is located and presses upon the head 14 of valve rod 12 with a light force thus preventing the valve 12 from being forced against its seat with a damaging pressure when the piston members 9$^a$ and 9$^b$ are forced close together.

Assume now that the packing of piston member 9$^a$, should leak, and that the pressure above the piston member 9$^b$ is lower than the supply pressure below the member 9$^a$. Under these conditions, pressure in the space 17 between the piston members will begin to build up above that in the upper part of chamber 2, and the member 9$^b$ of the piston will move upwardly and unseat the valve 12,—thus permitting the excess of fluid to enter the duct 11$^a$ and pass through the tubular upper end of the rod 8 (in which the stem 11 of piston member 9$^b$ has a loose fit), and thence through the duct 13 to the lower portion of chamber 3, and finally through a duct 18 to the atmosphere. Throughout the operations of applying and releasing the brakes, the piston member 9$^b$ will remain balanced as any excess of pressure in the space 17 between the piston members will be vented by the valve 12, and any lack of pressure in said space (as will be the case when releasing the brakes) will be quickly supplied by leakage past the packing ring of piston member 9$^b$ as the space 17 is very small. It is clear therefore that when the packing of piston member 9$^a$ is perfect the device will operate precisely as it would if the piston member 9$^b$ were removed and the duct 13 closed by a plug.

The casing 1 is provided in its upper portion with a duct 19 with which a pipe 20 communicates for conveying the controlling fluid (through the medium of a hand-operated device hereinafter described) to the chamber 2 above the piston 9. A pipe 21 from a main supply source, conveys supply fluid to a duct 22, and, by the latter, such supply fluid is conveyed to the chamber 2 under the piston 9. A duct 23 communicates with the portion 6 of passage 5 and through a valve chamber 24, with a duct 25, and with the latter, a pipe 26 leading to the brake cylinders communicates.

A duct 26$^a$ connects the lower part of chamber 24 with the chamber 3, so that fluid under brake cylinder pressure will enter said chamber 3 above the piston 10, while the duct 18 provides means for supplying atmospheric pressure below said piston 10.

The duct 23 is connected, by a duct 27 to the exhaust chamber 4, and in the latter an exhaust valve 28 is located. A spring 29 presses this valve toward its seat and the operation of this valve is controlled by the movements of the connected pistons 9—10.

It is apparent that when the parts above described, are in the positions shown in the drawings, air can escape from the brake cylinders through duct 25, valve chamber 24, ducts 23 and 27 to the exhaust chamber 4 and from the latter past the valve 28 to the atmosphere through the port 30. It will also be seen that when the exhaust valve 28 is closed and the valve 7 is opened (by an excess of supply pressure under the piston 9, over the controlling pressure above said piston), supply fluid will pass from the lower portion of chamber 2, through the duct 23, valve chamber 24, duct 25 and pipe 26 to the brake cylinder.

The mechanism thus far described, comprises two pistons 9—10 rigidly connected together so that they will always move in unison and valves so arranged that, being controlled by the movements of the pistons, they provide means for admitting fluid to and exhausting it from the brake cylinders,—one of the pistons being exposed (on the side next to the other piston) to fluid under supply pressure; the other side of the same piston being exposed to the pressure existing in the controlling pipe 20. The other piston (10) is (as above explained), exposed to brake cylinder pressure on the side next to the piston 9 and to atmospheric pressure on the other side. As a result, the brakes can be applied and the cylinder pressure maintained by a reduction of pressure in the controlling pipe 20 and the upper part of chamber 2 and in the normal (release) position of the mechanism, both pistons will be balanced so that there will be no undue wear nor friction produced in the preliminary application of the brake.

Assume now that the pressures in the controlling pipe 20 and supply pipe 21 are equalized (viz. that the release is full) and that it is desired to put a certain amount of pressure in the brake cylinder and to maintain that degree of pressure, notwithstanding any leakage which might occur from the brake cylinders: This may be accomplished by first reducing the pressure in the controlling pipe 20 to the proper point and then closing this pipe completely. Then the excess of pressure entering the chamber 2 from the source of fluid supply will cause an upward movement of the pistons 9 and 10 until the exhaust valve 28 is closed by the action of the spring 29. The upward movement of the pistons 9—10 will continue (the lower end of rod 8 leaving the exhaust valve 28) until the valve 7 permits air entering the chamber 2 by the duct 22, to flow from said chamber, through duct 23, valve chamber 24, duct 25 and pipe 26 to the brake cylinders, until the pressure in the latter (which pressure, by reason of the duct 26$^a$ acts upon the upper side of piston 10), is sufficient to overcome the opposing pressure on the piston 9. The pistons 9—10 will then move downwardly until the valve 7 closes communication between chambers 6 and 6$^a$ and thus prevents the further supply of fluid to the brake cylinders, and the valve 28 opposes the further movement of the pistons because of the spring 29 and the action of the cylinder pressure on the valve 28. If the pressure in the brake cylinder falls at all, the upward force acting against the piston 9 will overcome the downward force acting on the piston 10 and the valve 7 will again admit air to the brake cylinders until the desired pressure is again restored. By reducing the pressure in the controlling pipe 20, to a still lower degree, the cylinder pressure will, of course, be increased. Should it be desired to release the cylinder pressure, it is simply necessary to increase the pressure in the controlling pipe 20, when the valves will be caused to assume the positions shown in Fig. 1, the release being then complete if the pressure in the controlling pipe 20, is fully restored, but only partial if the pressure in the said pipe is only partially restored. Assuming that it is only partially restored,—viz. that there is still a difference of pressure acting against the piston 9 tending to force it upward,—when the pressure of the cylinder air acting on the piston 10 is no longer able to hold the valve 7 in the position shown in Fig. 1, said valve will be moved upwardly until the valve 28 closes and the force exerted by the cylinder pressure and the spring 29 acting on said valve no longer aids in this motion,—thus stopping the exhaust and retaining the desired amount of cylinder pressure.

As has been hereinbefore intimated, the valve mechanism shown in the drawings is adapted particularly for use in controlling the operation of the brakes on the locomotive and tenders, and for this reason it is desirable that provision shall be made to limit the brake cylinder pressure in ordinary service operation to some predetermined degree which would be less than it would be possible to obtain from the ordinary supply pressure used. It is also desirable to provide means for obtaining a higher brake cylinder pressure in case of emergency than is obtainable in ordinary service operation, and, after such higher cylinder pressure has been obtained and retained for a specific length of time, to gradually reduce said pressure to a somewhat lower point. Furthermore, it is advantageous to provide means for venting brake pipe pressure to the brake cylinders in cases of emergency, and also to provide means whereby sufficient volume of air will be provided to insure the proper operation of the mechanism (which latter would usually be located near the manually operated controlling means) to effect the sure and positive operation of the locomotive brakes, particularly when the application of the locomotive brakes is made independently of the train brakes.

To accomplish the various ends above enumerated, devices hereinafter described will be employed.

The casing 1 is provided with a chamber 31 having located therein, a piston 32, and this piston is provided with a tubular stem 33 which depends therefrom and is movable in a contracted portion of the chamber 31. The lower end of the stem 33 constitutes a valve 34 for controlling communication between the chambers 31 and 24, and in this valve end of stem 33, small ducts 36 are provided. The piston 32 also constitutes under certain conditions, a valve for closing a duct 37 which communicates at its lower end with the chamber 31 and at its upper end with a chamber 39 in the upper portion of the casing,—said chamber 39 also communicating, through the medium of a duct 40 and a pipe 41 with the train pipe 20$^a$.

One end of a duct 42 communicates (under certain conditions) with the chamber 39, and such communication is closed by means of a valve 43, pressed toward its seat by means of a spring 44. The stem 45 of valve 43 passes downwardly through the chamber 31 and terminates within the tubular stem 33 a short distance above the lower end of the latter. A spring 46 encircles the stem 45, said spring having an abutment against the upper wall of the chamber 31 and resting at its lower end upon the lower portion of the tubular stem 33 and thus pressing the valve 34 on its seat.

The duct 42 is adapted to conduct fluid to a chamber 47, but passage of fluid from the latter to said duct 42 is prevented by means of a check valve 48. A spring 49 presses the valve 48 toward its seat and a rod 49$^a$ within the spring, serves to limit the movement of said valve in the other direction. The chamber 47, communicates, by means of a duct 50 with the duct 25 leading to the brake cylinder pipe 26. From this arrangement it will be observed, that when the valve 43 is opened communication is established between from the brake pipe 20$^a$, through pipe 41 and duct 40 to chamber 39, and from the latter through duct 42, chamber 47, and ducts 50 and 25 to the brake cylinder pipe 26.

A cage 51 is located within the casing and is made with a transverse passage 52, which connects the chamber 24 with the duct 25 and also with the duct 26ª, whereby brake cylinder pressure is admitted to the chamber 3, and this cage is also provided with a vertical passage 53, adapted, under certain conditions, to communicate with the valve chamber 24, with which latter, the duct 23 also communicates. Under other conditions, the passage 53 is closed by means of a piston valve 54 operating in the valve chamber 24, the upper portion of which is of a cylindrical form, said valve 54 being pressed in a direction toward its seat by means of a light spring 55.

Below the cage 51, a chamber 56 is provided, and within this chamber, a piston 57 is located. On its upper portion, the wall of the chamber is made with a groove 58 constituting a by-pass, and said piston is adapted to be pressed against a seat 59. A small duct 60 connects the duct 52 in the cage 51 with the space over the piston 57.

The chamber 56 is made with an elongated portion 61 having a vent 62, and the wall of the main portion of chamber 56 is also provided with a series of vents 63 open to the atmosphere.

A tubular stem 64 projects upwardly from the piston 57 and is movable in the cage 51. A stem 65 depends from the valve 54 and loosely enters the tubular stem 64 of piston 57. The piston 57 is also provided with a rod 66 which depends through the chambers 56—61 and passes freely through a nut 67 adjustable in the lower end of the portion 61. A spring 68 encircles the rod 66, and bears at its respective ends against the piston 57 and the nut 67,—by means of which latter, the tension of said spring can be adjusted. Under normal conditions, the nut 66 will be protected by means of a cap 69.

It will be observed that the valve 54 is held from its seat by the tension of the adjustable spring 68, and that when the brake cylinder pressure in the duct 25 rises sufficiently to overcome the resistance offered by the spring 68, the piston 57 will descend and permit the valve 54 to become seated. Thus the supply of fluid from the duct 23 to the chamber 24 and to the brake cylinders will be stopped, said valve 54 remaining closed as long as the pressure in the brake cylinders is maintained.

A reservoir 70 is employed for the purpose of providing a sufficient volume of air for insuring the proper operation of the mechanism, and also to provide means for causing the operation of the piston 32 under certain conditions. This reservoir will therefore be hereinafter referred to as a "volume reservoir." A duct 71 communicates with the volume reservoir 70 and also with a chamber 72. The latter communicates, by means of a large duct 73 with the bottom of the chamber 31 below the piston 32 and also with said chamber above the piston 32, by means of a small duct 74. It will be recalled that the chamber 31 is open to train pipe pressure through the ducts 37 and 40, and in order to prevent the fluid under train pipe pressure from reaching the volume reservoir, a check valve 75 is provided in the bottom of the chamber 72 where the duct 71 communicates with the latter. In "service" applications of the brakes the air from the volume reservoir 70 flowing through the small duct 74 passes out to the train pipe, through the ducts 37 and 40 but in "emergency" applications of the brakes the pressure in the duct 40 is reduced so rapidly that the small duct 74 is no longer able to keep the pressure on the two sides of the piston 32 equalized, and consequently the higher pressure from the volume reservoir, acting against the under side of the piston 32 (which is freely exposed to said pressure by duct 73) causes the latter to rise. When the piston 32 thus rises, it will operate to close the small duct 74 and open a groove or port 76 in the upper portion of the chamber 31, thus venting volume-reservoir fluid past piston 32 to the train pipe through ducts 37 and 40. The upward movement of the piston 32 will also operate to unseat the valve 43 and permit fluid under train pipe pressure to pass from the train pipe duct 40, through the duct 42 past the check valve 48, through the ducts 50 and 25 to the brake cylinders. The check valve 48 prevents a back flow of air to the train pipe duct 40 when the brake cylinder pressure is built up. The upward movement of the piston 32 also unseats the valve 34, and thus, through the ducts 36, exposes the top of the piston valve 54 to the low train pipe pressure. In consequence of this, the valve 54 cannot close, even though the piston 57 moves downward, because brake cylinder pressure in the lower portion of the valve chamber 24 holds said valve 54 from its seat.

When the pressure in the volume-reservoir 70 and in the train pipe duct 40 are nearly equalized, the springs 44 and 46 will return the valve 43 and piston 32, thus closing valve 34 and allowing the valve 54 to be pressed to its seat by spring 55, as the pressures acting on the upper and lower sides of the valves quickly equalize the leakage of air from one side to the other. The high pressure obtained in the brake cylinder is now reduced by reason of the exhaust afforded by the vents 63 (the piston 57 being in a position below said vents) and the said vents are so located that when subsequently closed by the upward movement of the piston 57, the brake cylinder pressure will have been reduced to some desired point which may be equal to or greater than the maximum amount obtainable in service applications.

The appliances by means of which the mechanism hereinbefore described can be controlled by the engineer, are shown at the left of Fig. 1 of the drawing and in the various detail views, and embody probably in a single structure, two hand-operated valves A and B, coöperating with various ducts, ports and subordinate valves as hereinafter fully explained.

One purpose of the valve A is to control the pressure in the train pipe and thus to permit the engineer to apply, release and hold the brakes on the whole train when desired and this valve is also adapted to perform certain other service as will hereinafter be explained. As the valve A controls the train pipe pressure, it is evident that it not only controls the brakes on the cars of a train, but also those on the locomotive when the chamber 2 is connected with the train pipe,—such connection being governed by the valve B. Thus it is evident that when desired, the locomotive brakes and those on the rest of the train may be operated in entire unison by the use of the valve A, when the valve B is left in such position as to provide a connection between the train pipe and chamber 2 at all times.

The purpose of the valve B is to provide means for controlling the brakes on the locomotive and tender independently of those on the cars of the train, and also to operate in conjunction with the valve A to permit, when desired, a release of the train brakes independently of those on the locomotive. The valve B is also adapted to provide means for controlling the recharge of the volume reservoir and to connect chamber 2 with said reservoir and to disconnect it from the latter when desired. These valves, both of which are of the rotary type, are suitably housed within a casing and provided, respectively, with handles $A^1$ $B^1$ for turning them.

A pipe 77 from the main supply reservoir communicates with one end of a duct 78, the other end of which latter communicates with the space within the casing, over the rotary valve A. A pipe 79 which carries a reduced supply pressure, communicates with a duct 80, the latter terminating in a port $a^1$ and in said duct 80 a check valve 81 is located. A duct 82 connects, through a manually operated plug valve 84, port $b^1$, under valve A, with the train pipe $20^a$. A duct 83 connects, under certain conditions through manually operated plug valve, 84, duct 82 with a small duct 85, and in the said duct 83, a check valve 86 is located. The duct 85 communicates at one end with the supply pressure duct 78 and at its other end with duct 83 above check valve 86. A duct $85^a$ connects duct 83 above check valve 86 with a chamber 87 over the rotary valve B. A duct $85^b$ connects duct 83, above check valve 86, with the space below the plug cock 84 and thus conveys supply pressure fluid to said space in order to hold the cock 84 on its seat at all times. A duct 88 connects, through the plug valve 84, a port $c^1$, under valve A with a port $a$ under valve B. The plug valve 84 is provided with a suitable handle 89, by means of which to operate it. A duct 90 communicates at one end with the train pipe duct 82, and at its other end, this duct 90 terminates in a port $b$ under the valve B. A duct 91 terminates at one end in a port $c$ under valve B and at its other end this duct communicates with a pipe 92, which latter is connected with the volume reservoir 70. The pipe 20 (which as before stated conducts controlling fluid through the duct 19 to the chamber 2) communicates with a duct 93, and the latter terminates at its upper end in a port $d$ under the valve B. A duct 94, having a port $e$ at one end is open at its other end to the atmosphere. The various ducts and ports above described are shown in Fig. 1 of the drawings, but other ports, ducts and passages are provided in the valves and their seats. These are shown in the detail views, and their purpose will become apparent in the following explanation of the functions performed by the various manipulations of the manually operated valves.

The valve A is capable of being set to six definite positions which may be designated by the following terms:—viz. "release," "running," "holding," "lap," "service" and "emergency."

Under average conditions, the rotary valve B should be in its "running" position as shown in Fig. 1 (in which position ports $a, c$ and $d$ are freely connected) and it may be assumed (during the following explanation) to be in that position until a statement to the contrary is made.

In "release" position of the valve A, fluid under main reservoir pressure from the pipe 77 passes through port $f^1$ (which latter extends through valve A) (see Fig. $2^a$) to port $b^1$ and thence through duct 82 to the train pipe, resulting in rapidly raising the pressure in the latter and consequently releasing the brakes on the train, but not on the locomotive and tender, because port $c^1$ is closed when the valve A is in this position, and therefore the pressure in the volume reservoir 70 and in the chamber 2 cannot rise,—the check valve 75 (Fig. 1) preventing a flow of air from the chamber 72 to the duct 71. In this, "release," position of valve A, the cavity $d^1$ of said valve connects ports $a^1$ and $p^1$, the latter leading to the atmosphere and serving as a warning port. A port $r^1$ Fig. $2^a$ (extending through valve A) allows reservoir air to pass to a port $h^1$ which leads to the top of an equalizing piston and to an equalizing reservoir. The piston and reservoir here referred to are not shown in the drawing, as they are quite common in automatic brake valves and constitute no part of my present invention. (Pipe 20$^b$ connects port $h^1$ with the equalizing reservoir.)

In "running" position of valve A (as shown in Fig. 1), the cavity $d^1$ connects ports $a^1$ and $b^1$ and the cavity $d^2$ in said valve joins port $c^1$ with port $b^2$, which communicates at all times with the port $b^1$, through a passage $k^1$. The cavity $d^2$ also connects ports $h^1$ and $b^2$. Thus it will be seen that fluid under reduced pressure from the pipes 21—79 (supplied through a reducing valve) will flow from port $a^1$ to ports $b^1$, $b^2$, and thence to the train pipe,—thus releasing the train brakes. As the train pipe port $b^1$ is also connected with the port $c^1$ the rise of train pipe pressure will cause a flow of air to the port $a$, under valve B; through passages $g$ and $h$ of said valve B, to the pipes 20 and 92 and thus to the chamber 2 over the piston 9 and to the volume reservoir 70. This will effect a release of the locomotive brakes simultaneously with those on the cars of the train.

Now if the valve A be moved from "running" position to "release" or to "holding" position, before the pressures in the volume reservoir 70 and chamber 2 are restored fully to normal (i. e. the same as the pressure acting on the under side of piston 9), it is evident from the nature of the application mechanism, that the locomotive brakes will not be fully released. A graduated release of the locomotive brakes will therefore be permitted, by the use of the valve A alone, if desired, by alternately moving it between "running" and "release" or "holding" positions.

In "holding" position of the valve A, the cavity $d^1$ will still connect ports $a^1$ and $b^1$ and cavity $d^2$ will still connect ports $b^2$ and $h^1$, but the port $c^1$ will be closed, thus permitting a release of the train brakes and a recharge of their auxiliary reservoirs with reduced pressure, while the locomotive brakes are held applied, as port $c^1$ is closed and therefore the pressure in the volume reservoir and chamber 2 cannot rise.

In "lap" position of the valve A, all the ports, except the port $c^1$ are closed, and this port $c^1$ is connected with the port $b^2$ by cavity or passage $g^1$ in order to permit of equalization of the train pipe pressure with that in the volume reservoir 70 in case these pressures have not yet become equal. This "lap" position of the valve A is used to retain any desired pressure in the train pipe.

In "service" position cavity or passage $g^1$ will connect ports $c^1$ and $b^2$ for the same purpose as in "lap" position of the valve. (It will be observed that as this connection provides a free passage between the volume reservoir 70 and the train pipe, when the cock or plug valve 84 is open as shown in Fig. 1, the check valve 75 in the mechanism at the right of Fig. 1, will not rise from its seat and will thus save wear; when, however, the locomotive is used as a helper, the cock or plug valve 84 will be closed, and the air from the volume reservoir 70 will pass the check 75 and flow through chamber 72, ducts 74 and 37 to train pipe duct 40 and thus to the train pipe, in service applications.) In this ("service") position of the valve A, the cavity $d^2$ connects ports $h^1$ and $q^1$, the latter leading to the atmosphere. The pressure in the equalizing reservoir (not shown) is thus reduced and the train pipe pressure slowly vented to the atmosphere in the usual way.

In "emergency" position of the valve A, the port $c^1$ is closed and cavity $e^1$ connects port $b^2$ through passage $e^2$, cavity $m^2$ and port $m^1$ to the atmosphere,—thus causing a quick, heavy reduction of train pipe pressure and causing the emergency device in the mechanism at the right of Fig. 1 to operate as hereinbefore explained, and this action is transmitted by quick-acting triple valves throughout the train. The result is, of course, a quick, powerful application of all brakes on the locomotive and train.

In the operation of the controlling valve B,—when said valve is in "release" position as shown in Fig. 4, ports $a$, $b$ and $c$ are connected by cavity $g$ and passage $h$, thus insuring the equalization of train pipe and volume reservoir pressure. Port $d$ leading to the chamber 2 is connected with supply pressure by port $p$ thus causing a prompt release of the locomotive and tender brakes without in any way affecting the train pipe pressure, regardless of the degree of the same. As soon as the valve B is moved from "release" position to any one of its other positions, communication is again established between the chamber 2 and the volume reservoir where, because of the construction of the valve mechanism at the right of Fig. 1, the pressure cannot be higher (except for a few seconds during an emergency application) than the train pipe pressure, and consequently if the train pipe pressure is below its normal value at the time that the valve B is moved from its "release" position, the locomotive brakes will be again applied with a force corresponding to the amount of the train pipe reduction.

In "non-holding" position of the valve B, as shown in Fig. 5, ports $a$, $b$ and $d$ are freely connected and a restricted passage $m$ joins them to port $c$ which leads to the volume reservoir 70. Thus it will be seen that chamber 2 is in constant, direct communication with the train pipe and consequently the operation of the mechanism at the right of Fig. 1 will no longer be controllable in its "release" and "holding" position by the valve A independently of the brakes on the cars of the train. This may, at times be advantageous on controlling locomotives and will be necessary on "helpers," as then, a direct connection between chamber 2 and the train pipe is essential in order to secure a release of the locomotive brakes. On such a locomotive, the cock or plug valve 84 must be closed and consequently port $a$ will be useless. The restricted port $m$ is made small for two reasons,—first, in order to prevent a too rapid charging of the volume reservoir, which might occur when an unusually high pressure is used in releasing the brakes (i. e. for recharging the train pipe), and, second;—in order to still so restrict the flow of air from the volume reservoir (which may obviously pass to the train pipe through this port $m$ and the passages above the check valve 75), that the piston 32 will be moved upwardly when an emergency application is made.

In "running" position of the valve B, ports $a$, $c$, and $d$ are freely connected for the purpose explained in the description of the operation of valve A. The "running" position of the valve B is shown in Fig. 1 and also in Fig. 6.

In "lap" position of the valve B, as shown in Fig. 7, all the ports are closed with the exception of ports $c$ and $d$ which are simply connected, thus permitting the pressure existing in the volume reservoir 70 to act on the piston 9 and thus enabling the engineer to hold any desired cylinder pressure that he may have obtained, by a reduction of pressure in said reservoir.

In "application" position of the valve B, as shown in Fig. 8, ports $c$, $d$ and $e$ are connected, thus permitting of a reduction of pressure in the volume reservoir 70 and chamber 2 and causing an application of the brakes, the amount of brake cylinder pressure obtained depending upon the extent of the reduction of pressure in the volume reservoir and the chamber 2. The check valve 75 now prevents a flow of air from the train pipe (through ducts 40, 37 and 74 and chamber 39, 31 and 72) to the volume reservoir 70 and thus makes possible the independent application and holding by the use of "lap" position of the brakes, on the locomotive and tender. It is also obvious, on the other hand, that in all positions of valve B, except "release", a reduction of train pipe pressure below that in the volume reservoir will cause check valve 75 to rise and permit of a simultaneous reduction of pressure in said reservoir and consequently in chamber 2 (which is connected to the volume reservoir in all positions, except "release", of valve B) and this will therefore cause an application of the locomotive brakes, to the same extent as those on the rest of the train. In order to prevent the valve B from being accidentally left in its release position (where the advantage just described is not obtained) some form of automatic returning device may be employed to move the valve B from "release" to "non-holding" position; such a device may be operated by a spring or by air pressure or by both. A function (besides that of causing the operation of the piston 32 in emergency) of the volume reservoir 70 is therefore, to provide a means of increasing the volume of air in chamber 2 in order to permit of the independent handling of the locomotive brakes with the use of valves having parts of appreciable size, and to reduce to a minimum the effect of slight leaks etc.,—it being undesirable to give a large volume of air to the chamber 2 directly as the flow of a large volume of air at a high pressure from such a chamber to the train pipe after an independent release of the locomotive brakes when the train pipe pressure was below its normal point might result in the building up of the train pipe pressure to a point high enough to release the train brakes, which would, of course, be undesirable.

The check valve 81 in the duct 80 which conducts reduced supply pressure fluid to the valve A, serves to prevent a flow of air from the train pipe back to the supply pipe 79 at any time when ports $a^1$ and $b^1$ are connected and air is being drawn rapidly from pipe 79 to apply the locomotive brakes, as such a back flow would mean a reduction of train pipe pressure below its normal value, which might be sufficient to cause an application of the train brakes and this would be an objectionable feature under certain conditions.

The check valve 86 is provided to furnish a means of charging the main reservoir on "dead" engines (i. e. those, on which the compressors are inoperative) with air from the train pipe. This is effected when the cock or plug valve 84 is turned so that port $x$ therein registers with the train pipe $20^a$, and train pipe air is thus admitted to the duct 83 and thence by check 86 (which prevents a back flow) and ducts 85 and 78 and pipe 77 to the main reservoir. In such position, of the cock 84 the ducts leading from ports $b^1$ and $c^1$ are closed completely. With the position of the cock 84 at 180° from that just described, the ducts $b^1$ and $c^1$ are closed, but there is no communication between the duct 83 and the train pipe. This is the position of the cock 84 on locomotives run as "helpers" when they have their own air supply. The object of this closing ducts 82 and 88 on all locomotives run as helpers and or "dead" engines is to cut off all communication between the train pipe and valve A, and between port $a$ (of valve B) and valve A, and thus prevent the unwarranted operation of valve A from influencing the train pipe pressure or that in the volume reservoir and chamber 2 in any way, and also to prevent other undesirable results which might occur if these ducts (82 and 88) were not closed, under the conditions stated.

Having fully described my invention what I claim as new and desire to secure by Letters-Patent, is:—

1. In an air brake apparatus, the combination with a valve mechanism to control supply pressure fluid to the brake cylinders and the exhaust of the same from said cylinders, of means for subjecting said valve mechanism to controlling pressure, means for augmenting the volume of air acting upon the valve mechanism under controlling pressure, and means for controlling said volume augmenting means.

2. The combination in an air brake apparatus, of two chambers a valve between said chambers for controlling supply pressure to the brake cylinders, pistons in said chambers and connected with said valve, means controlled by the movements of said pistons to control the brake cylinder exhaust, means for introducing train pipe fluid into one of said chambers at one side of the piston therein, means for introducing air under a different pressure into the same chamber on the same side of the said piston, means for subjecting the other side of the same piston to supply pressure, and means for subjecting the piston in the other chamber to cylinder pressure on one side and to atmospheric pressure on the other side.

3. The combination in an air brake apparatus, of two chambers, a valve between said chambers for controlling supply pressure fluid to the brake cylinders, pistons in said chambers, means controlled by the movements of said pistons to control the brake cylinder exhaust, two manually-operated valves, means coöperating with both of said manually-operated valves for controlling, by an operation of either of them, the passage of train pipe pressure to and from one of said chambers at one side of the piston therein, means for subjecting the other side of the same piston to supply pressure, and means for subjecting the piston in the other chamber to cylinder pressure on one side and to atmospheric pressure on the other side.

4. In an air brake apparatus, the combination with a valve mechanism to control supply pressure fluid to the brake cylinders and the exhaust of the same from said cylinders, of means for subjecting said valve mechanism to train pipe pressure to control the same, a manually-operated valve connected with said valve mechanism and having ports and ducts to open and close communication of said valve mechanism with the train pipe, and to reduce controlling pressure in said valve mechanism after communication of the latter with the train pipe has been closed.

5. In an air brake apparatus, the combination with valve mechanism to control supply pressure fluid to the brake cylinders and the exhaust of the same from said cylinders, of means for subjecting said valve mechanism to train pipe pressure to control the same, a manually-operated valve connected with said valve mechanism and having ports and ducts to open and close communication of said valve mechanism with the train pipe, and means controlled by said manually-operated valve to augment the said controlling pressure after communication of the valve mechanism with the train pipe has been closed.

6. In an air brake apparatus, the combination with a valve mechanism to control supply pressure fluid to the brake cylinders and the exhaust of the same from said cylinders, of two manually-operated valves, means coöperating with both of said manually-operated valves for controlling, by an operation of either of them, the passage of train pipe fluid to said valve mechanism for controlling the operation of the latter.

7. In an air brake apparatus, the combination with a valve mechanism to control supply pressure fluid to the brake cylinders and the exhaust of the same from said cylinders, of means for subjecting said valve mechanism to a controlling pressure, means for augmenting the volume of air acting upon the valve mechanism under controlling pressure, and a manually-operated valve device having ports and ducts to control the action of controlling pressure in said valve mechanism, and for controlling said volume augmenting means.

8. In an air brake apparatus, the combination with a valve for controlling the admission of pressure fluid to the brake cylinders and its exhaust therefrom, of controlling means for said valve, means for subjecting said valve-controlling-means to train pipe pressure, means for shutting off said train pipe pressure from said valve-controlling-means, and means for subjecting said valve-controlling-means to a different pressure.

9. In an air brake apparatus, the combination with a valve for controlling the admission of pressure fluid to the brake cylinders and its exhaust therefrom, of controlling means for said valve, means for subjecting said controlling-means to train pipe pressure, means for shutting off said train pipe pressure from said valve-controlling-means, means for subjecting said valve-controlling-means to a different pressure, a volume reservoir, and means for connecting said volume reservoir with the valve-controlling-means to augment the volume of fluid which may be acting upon said valve-controlling-means.

10. In an air brake apparatus, the combination with controlling means for supplying fluid to and exhausting it from the brake cylinders, of a valve for closing admission of fluid to the brake cylinders, a chamber below said valve, a piston in said chamber subject to brake cylinder pressure and having a tubular upward extension, a rod depending from said valve and movable in said tubular extension from the piston, a spring for opposing the action of the cylinder pressure on said piston, means for adjusting the tension of said spring, and means for venting brake cylinder pressure from the chamber containing the piston when the latter shall have been moved a predetermined distance by the action of said brake cylinder pressure.

11. In an air brake apparatus, the combination with controlling means for supplying fluid to and exhausting it from the brake cylinders, of a valve for closing admission of fluid to the brake cylinders, a chamber below said valve open to cylinder pressure, a piston in said chamber, means for causing movements of said piston to control said valve, adjustable means for opposing the movements of said piston by cylinder pressure, and means for venting brake cylinder pressure from the chamber containing the piston when the latter shall have been moved a predetermined distance by the action of brake cylinder pressure.

12. In an air brake apparatus, the combination with controlling means for supplying fluid to and exhausting it from the brake cylinders, of a piston valve for closing admission of fluid to the brake cylinders, a valve chamber in which said piston valve is movable, a spring tending to press said valve toward its seat, a chamber below said valve and its seat and open to cylinder pressure, a piston in said chamber, a movable connection between said piston and the piston valve, an adjustable spring pressing against said piston and opposing the cylinder pressure acting upon said piston, and means for subjecting said piston valve to fluid pressure tending to oppose the seating of the same.

13. In an air brake apparatus, the combination with controlling means for supplying fluid to and exhausting it from the brake cylinders, and means for regulating the cylinder pressure, of a passage to conduct train pipe fluid to the brake cylinders, an emergency valve for closing said passage, operating means for said emergency valve, means for subjecting said valve-operating-means to the action of train pipe pressure, means for simultaneously subjecting said valve-operating-means to fluid pressure derived from a source independent of train pipe pressure, and means controlled by said emergency valve-operating-means, for controlling the cylinder regulating means.

14. In an air brake apparatus, the combination with controlling means for supplying fluid to and exhausting it from the brake cylinders, and means for regulating the cylinder pressure, of a passage to conduct train pipe fluid to the brake cylinders, an emergency valve for closing said passage, operating means for said emergency valve, means for subjecting said valve-operating means to the action of train pipe pressure, means for simultaneously subjecting said valve-operating-means to fluid pressure derived from a source independent of train pipe pressure, means controlled by said emergency valve-operating-means, for controlling the cylinder pressure regulating means, a check valve located in said train pipe passage between the emergency valve and the brake cylinders.

15. In an air brake apparatus, the combination with a valve mechanism for supplying fluid to and exhausting it from the brake cylinders, of a volume reservoir, manually-controlled means for subjecting said valve mechanism to controlling pressure from said volume reservoir, manually-operated means for charging said reservoir, means for communication between said volume reservoir and a train pipe, and a check valve in said means of communication permitting of a flow of air from the volume reservoir to the train pipe.

16. In an air brake apparatus, the combination with a valve mechanism for supplying fluid to and exhausting it from the brake cylinders, a train pipe, manually-controlled means for subjecting said valve mechanism to controlling pressure, means of communication between said manually-operated controlling means and a train pipe, and a check valve in said means of communication permitting of a flow of air to the train pipe.

17. In an air brake apparatus, the combination with a valve mechanism to control the supply of pressure fluid to and the exhaust of the same from the brake cylinders, a train pipe, and a fluid pressure supply pipe, of two manually operated valve devices, a duct terminating at one end in a port under one manually operated valve and connected with the train pipe, a duct terminating at one end in a port under the same manually operated valve and at the other end under the other manually operated valve, a manually operated cock for simultaneously opening or closing both of said ducts, and means of communication between said manually operated valve device and the fluid pressure supply pipe and between said manually operated valve devices and the first mentioned valve mechanism.

18. In an air brake apparatus, the combination with a valve mechanism to control the supply of pressure fluid to and the exhaust of the same from the brake cylinders, a train pipe, and a fluid pressure supply pipe, of two manually operated valve devices, a duct terminating at one end in a port under one manually operated valve and connected with the train pipe, a duct terminating at one end in a port under the same manually operated valve and at the other end under the other manually operated valve, a manually operated cock for simultaneously opening or closing both of said ducts, and means of communication between said manually operated valve device and the fluid pressure supply pipe and between said manually operated valve devices and the first mentioned valve mechanism, and means controlled by said manually operated cock for opening communication between the train pipe and supply fluid reservoir of a "dead" engine for charging said reservoir.

19. In an air brake apparatus, the combination with a valve mechanism to control supply pressure fluid to the brake cylinders and the exhaust of the same from said cylinders, of two manually-operated valves, means coöperating with both of said manually-operated valves for controlling, by an operation of either of them, the passage of train pipe fluid to said valve mechanism for controlling the operation of the latter, and means controlled by one of said manually operated valves for controlling the pressure of train pipe fluid.

In testimony whereof, I have signed this specification in the presence of two subscribing witnesses.

HOWARD M. P. MURPHY.

Witnesses:
A. N. MITCHELL,
R. S. FERGUSON.